April 3, 1934.    J. S. CLAPPER    1,953,394
MOWING AND TRIMMING MACHINE
Filed Nov. 28, 1932    4 Sheets-Sheet 1
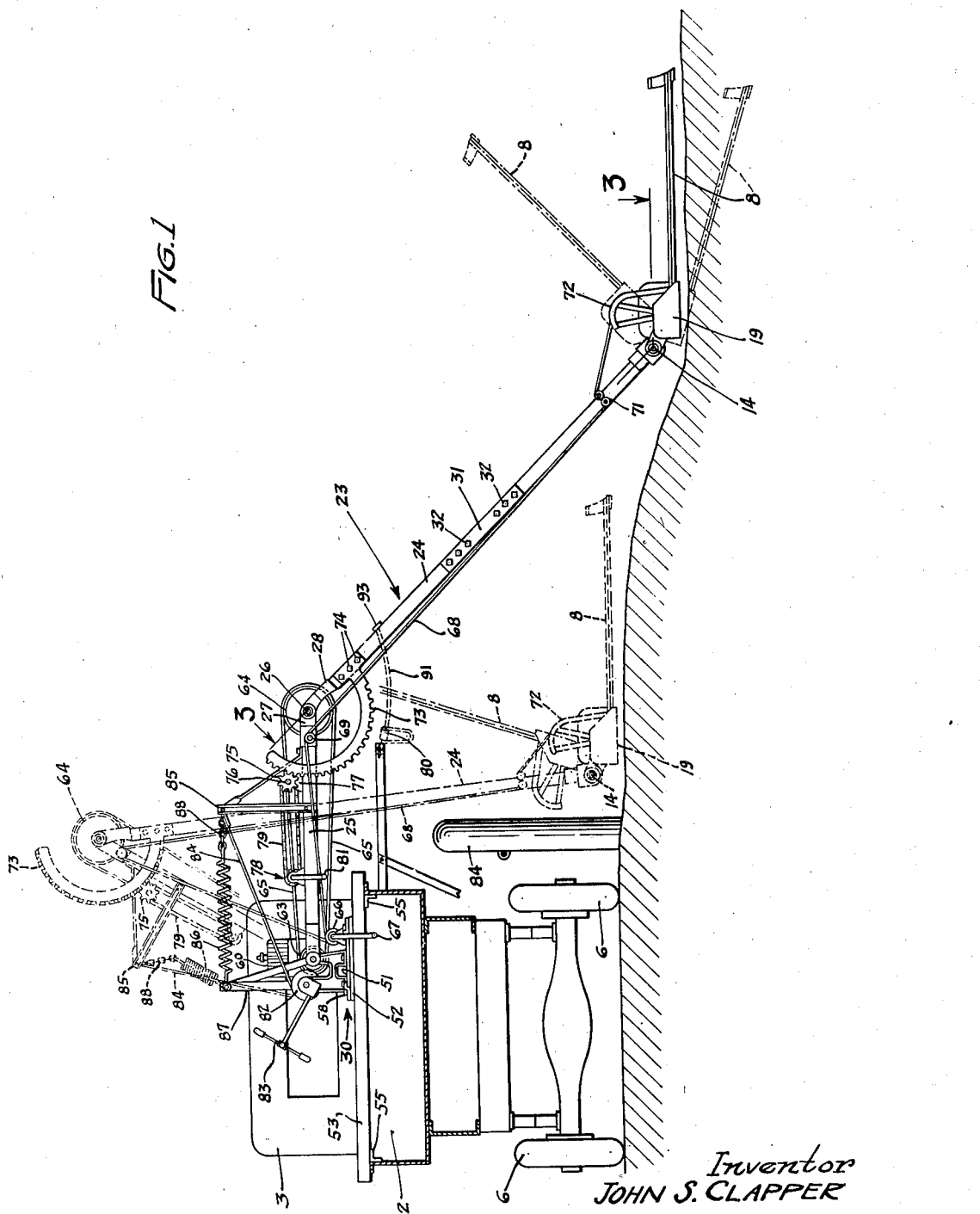
Inventor
JOHN S. CLAPPER
ATTORNEYS April 3, 1934.  J. S. CLAPPER  1,953,394
MOWING AND TRIMMING MACHINE
Filed Nov. 28, 1932  4 Sheets-Sheet 2
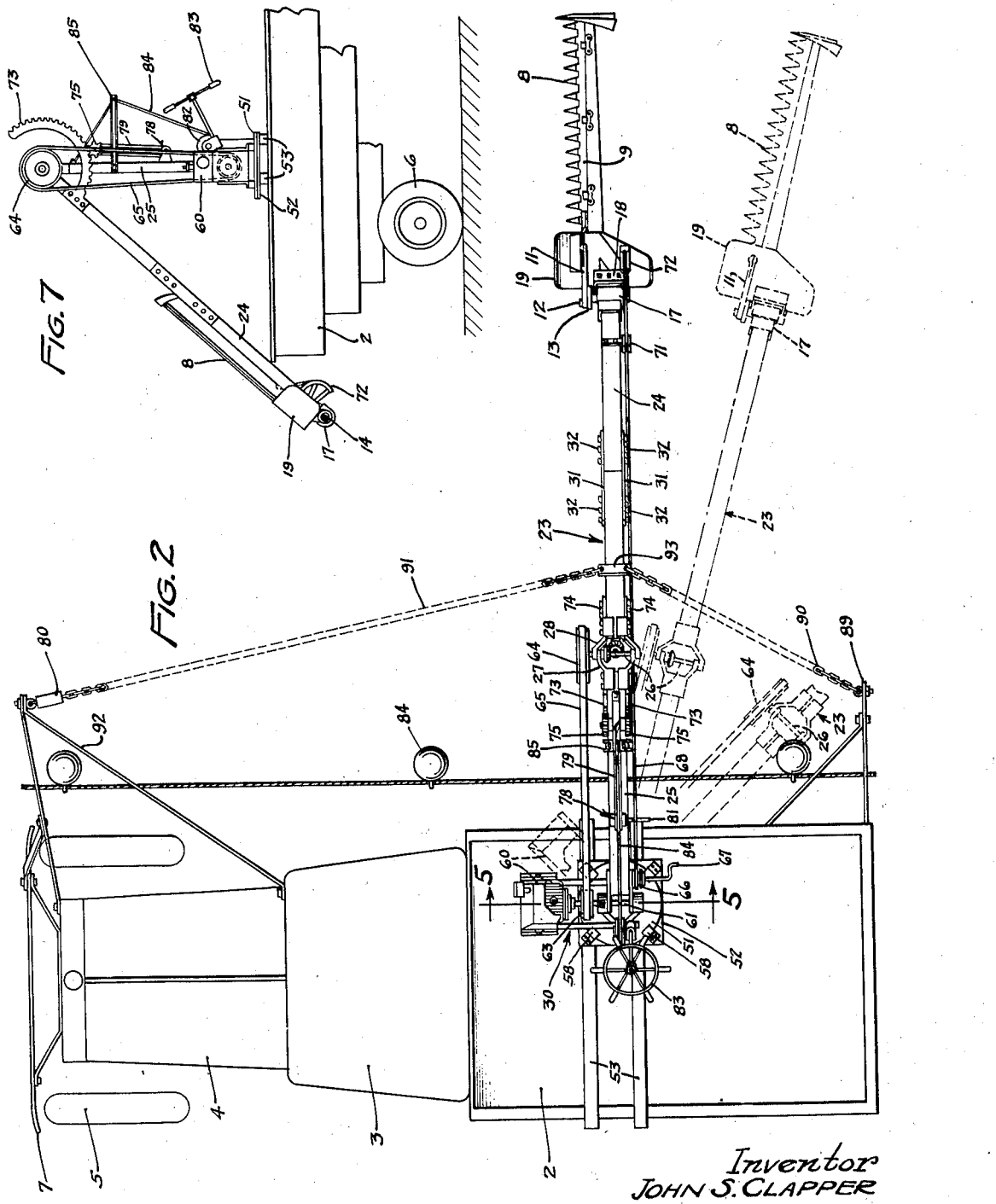
Inventor
JOHN S. CLAPPER
By Paul, Paul H Moore
ATTORNEYS April 3, 1934.    J. S. CLAPPER    1,953,394
MOWING AND TRIMMING MACHINE
Filed Nov. 28, 1932    4 Sheets-Sheet 3

Inventor
JOHN S. CLAPPER
By Paul Paul Moore
ATTORNEYS

April 3, 1934.  J. S. CLAPPER  1,953,394
MOWING AND TRIMMING MACHINE
Filed Nov. 28, 1932    4 Sheets-Sheet 4

Inventor
JOHN S. CLAPPER
By Paul, Paul & Moore
ATTORNEYS

Patented Apr. 3, 1934

1,953,394

UNITED STATES PATENT OFFICE 1,953,394

MOWING AND TRIMMING MACHINE

John S. Clapper, Minneapolis, Minn.

Application November 28, 1932, Serial No. 644,590

15 Claims. (Cl. 56—25)

This invention relates to a novel apparatus primarily for mowing grass and other vegetation growing along side of highways, and is adapted to mow the usual shoulders, slopes, ditch bottoms, and banks beside highways.

Various machines heretofore employed for mowing beside highways have been connected to a vehicle which travels upon the highway, but the machines themselves as heretofore employed have to travel upon the rough and uneven ground which composes the shoulders, slopes, ditch bottoms and banks of the highway, and in consequence are greatly handicapped in the permissible speed at which mowing may be done, and in the necessary strength of the machine. Moreover, the connection of the machine to the vehicle is usually such as to prevent the machine from passing outside of posts, road markers, guard rails, and mail boxes which are frequently encountered, and considerable time is lost in maneuvering the vehicle and machine to get past such obstructions, or to cut close to them so as to leave a minimum of uncut grass. Such maneuvering also frequency obstructs traffic on the highway and may be the cause of accidents.

An object of this invention is to provide a mowing device which may be completely carried by an ordinary truck or other vehicle traveling on the highway or shoulder, and which is capable of being extended laterally to mow the desired areas beyond the shoulder.

A further object of the invention is to provide a mowing device, preferably comprising a reciprocating sickle type of cutter bar, that is so carried as to be adjustable from the vehicle while traveling so as to accommodate the height or lateral slope of the ground being mowed.

A further object is to provide an articulated arm for carrying the mowing device having means whereby the latter may be extended from the vehicle and also whereby the mowing device, which is hinged to the arm, may be relatively adjusted with respect thereto, and a portion of said arm extending from the vehicle at an elevation above the usual height of guard rails, posts, etc., and permits another portion of the arm to carry the mowing device in a position close to the outside of such guard rails or posts, or to be extended for mowing areas further removed beyond the guard rails.

A further object is to arrange the hinging of said arm to the vehicle and to the cutter bar so as to permit folding the arm to position the cutter bar closely besides the vehicle when moving from place to place, and also whereby it may be swung entirely around behind the vehicle where it will constitute a still smaller interference to traffic while being transported along the highway.

Novel features of the invention reside in the simple and inexpensive construction whereby the cutter actuating means is carried on the vehicle and power is transmitted to the sickle at the outer end of the hinged arm, regardless of the angular articulation of its various joints. By this construction the parts immediately associated with the actuation of the sickle and mounting of the cutter bar can be of very light weight, so that by employing light weight construction for the cutter bar itself, the lateral distance at which an ordinary truck will be able to support the cutter bar and overhanging parts may be greatly extended.

A further advantage is that apparatus of this kind, either when mounted on a separate vehicle or built into a unified machine, is adapted for mowing diverse areas which may be in positions inaccessible to the travel of the machine or vehicle, as well as for trimming the sides and tops of shrubbery, or trimming the ends of tree branches by extending the arm and cutting device vertically. An application of the latter possibility is for keeping tree growths away from electric wires.

Other objects of the invention will appear from the following description and accompanying drawings and will be pointed out in the annexed claims.

In the accompanying drawings, there has been disclosed a structure designed to carry out the various objects of the invention, but it is to be understood that the invention is not to be confined to the exact features shown as various changes may be made within the scope of the claims which follow.

In the drawings:

Figure 1 is an elevational rear view of the apparatus, showing it attached to a conventional truck and the full and dotted lines showing different positions of the cutter bar;

Figure 2 is a plan view of Figure 1 with the counterbalancing means removed and showing by full and dotted lines the supporting arm of the cutter bar in operating position and in the position after striking an obstruction or partially swung around into the transporting position behind the truck;

Figure 7 is an elevational side view of the apparatus showing only the rear end of the truck or vehicle on which it is mounted, also showing the articulated arm and cutter bar swung around to the rear position in line with the direction of travel, and folded in transporting position.

Figure 3:
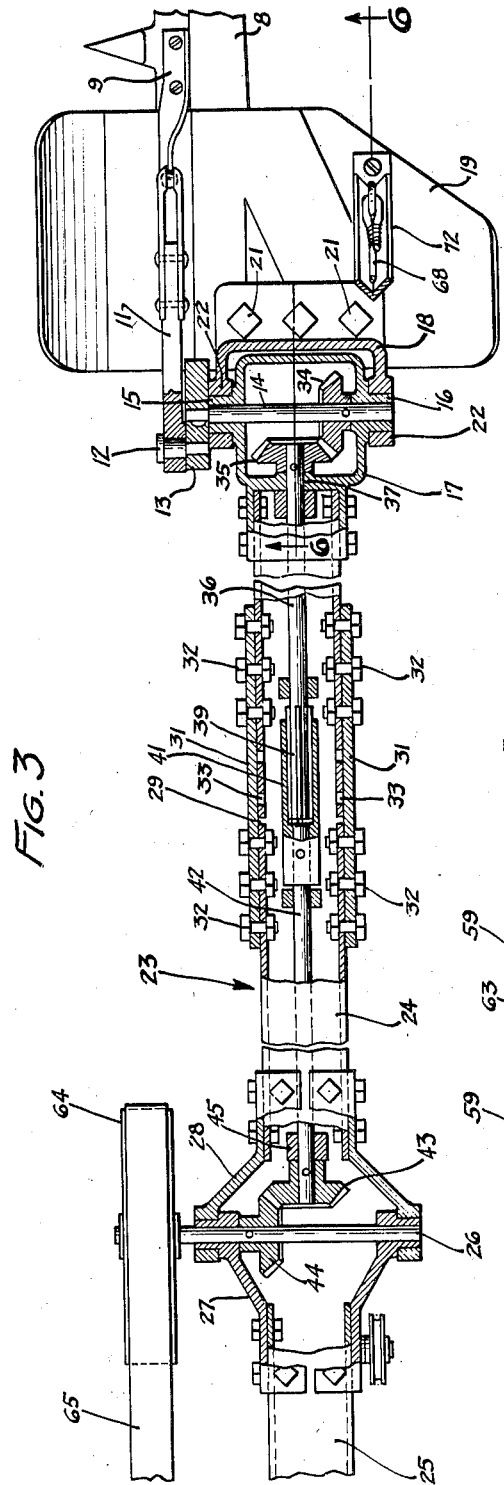
Figure 3 is an enlarged detail sectional view substantially on the line 3—3 of Figure 1, showing one way of constructing the outer end of the supporting arm of the cutter bar whereby it may be extended.
Figure 4:
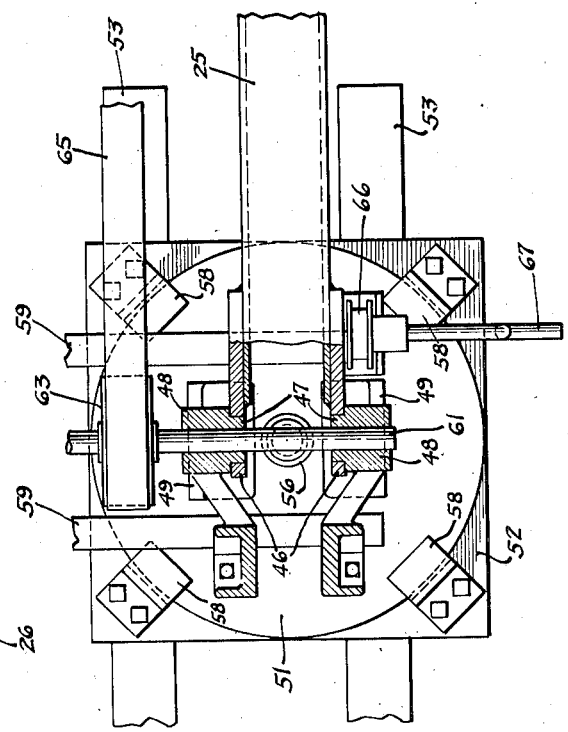
Figure 4 is an enlarged detail sectional plan view on the line 4—4 of Figure 5, showing the means provided on the truck or vehicle for supporting the cutter bar supporting arm, and also showing the means whereby the supporting arm may be horizontally swung with respect to the line of travel of the vehicle.

In the selected embodiment of the invention here shown, for purposes of disclosure, there is illustrated in Figures 1 and 2, a truck comprising the usual body 2, cab 3, hood 4, front wheels 5, rear wheels 6, and front bumper 7.

The novel mowing apparatus herein disclosed is shown comprising a cutter bar 8 provided with the usual sickle 9 having a pitman 11 connecting it with a crank pin 12 secured to the usual crank disk 13 which, in turn, is secured to a shaft 14 shown mounted in suitable bearings provided in oppositely disposed cylindrical extensions 15 and 16 provided upon a suitable gear case 17. A bracket 18 is shown secured to the inner shoe 19 of the cutter bar 8 by suitable bolts 21, and is provided with spaced apart bearings 22 adapted to receive the cylindrical extensions 15 and 16 provided upon the gear case 17, to thereby provide a pivotal support for the cutter bar 8 and the sickle 9 mounted thereon, as best seen in Figure 3.

The cutter bar 8 is supported by means of an arm generally indicated by the numeral 23. This arm is shown comprising two sections 24 and 25 hinged together by means of suitable brackets 27 and 28, as best shown in Figures 1 and 3. The section 24 is shown relatively longer than the section 25, and is preferably of channel cross section. The section 24 is shown at 29 as being divided in two pieces, which pieces are adjustably secured together by plates 31 and bolts 32, one of said section pieces being provided with a plurality of spaced apertures 33, whereby the section 24 may be longitudinally adjusted when necessary, and also whereby a third piece (not shown) may be inserted in the section 24 to further extend the cutter bar 8 from the vehicle.

Figure 6:
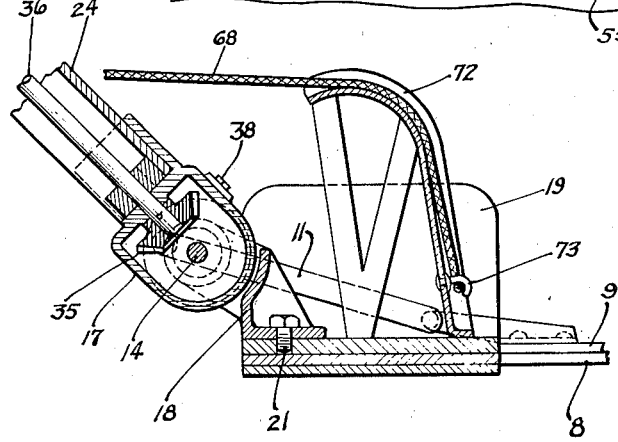
Figure 6 is a detail sectional view on the line 6—6 of Figure 3, showing the connections between the supporting arm and the cutter bar.

A beveled gear 34 is secured to the shaft 14 and meshes with a similar gear 35 secured to a shaft 36, one end of which is supported in a bearing 37 provided in the gear case 17. The gear case 17 is preferably constructed as shown in Figures 3 and 6 so as to provide an oil tight casing for the gears 34 and 35, but might be an open bracket. In the drawings, I have shown the gear case 17 as being integrally formed, but it is to be understood that in actual practice, it will be made in two parts suitably bolted together to facilitate assembling. A suitable filler plug 38 may be provided in the upper wall of the gear case for the introduction of a suitable lubricant.

The upper end portion 39 of the shaft 36 is shown provided with suitable splines adapted for interlocking engagement with a sleeve 41 secured to shaft 42 provided at its upper end with a gear 43 meshing with a similar gear 44 secured to a shaft 26, which is supported in suitable bearings shown provided in the bracket 27 which cooperates with the bracket 28 to provide the pivotal connection between the arm sections 24 and 25, as best shown in Figure 3. The upper end of the shaft 42 is shown supported in a suitable bearing 45 preferably integrally formed with the bracket 28. Whenever a third piece is inserted in the arm section 24 at 29, there will also be a third shaft (not shown) introduced between the shaft 36 and sleeve 41, by means of a similarly formed sleeve and splines. To suitably support the shafts 36 and 42, together with the previously mentioned third shaft, bearings 40 are provided on both parts of the arm section 24.

The relatively shorter arm section 25 is pivotally mounted upon a suitable supporting structure generally indicated by the numeral 30, carried upon and secured to the vehicle or truck. To thus mount the arm section 25 upon the supporting structure 30, a pair of spaced bars 46 are shown secured to the opposite sides of the arm by such means as welding. The arm section 25, like the section 24, is preferably of channel cross section. The bars 46 are provided with suitable apertures adapted to receive a pair of inwardly facing reduced cylindrical extensions 47 shown provided upon bearings 48 on a pair of brackets 49, as more clearly shown in Figure 5. The supporting structure 30 comprises a circular plate 51 mounted for rotary movement upon a fixed plate 52 shown secured to a pair of cross members 53 by such means as angle irons 54. The brackets 49 are secured to the plate 51. The cross members 53 are shown detachably secured to the upper edges of the walls of the truck body by suitable means such as angle irons 55, shown in Figure 1. A pivot pin 56 is received in alined apertures provided in the plates 51 and 52 and may be retained in said apertures by a suitable cotter pin 57. Suitable angle clips 58 are shown provided at the corners of the lower plate 52 to form guides for the circular plate 51 to prevent it from tilting or rocking on the lower plate.

Figure 5:
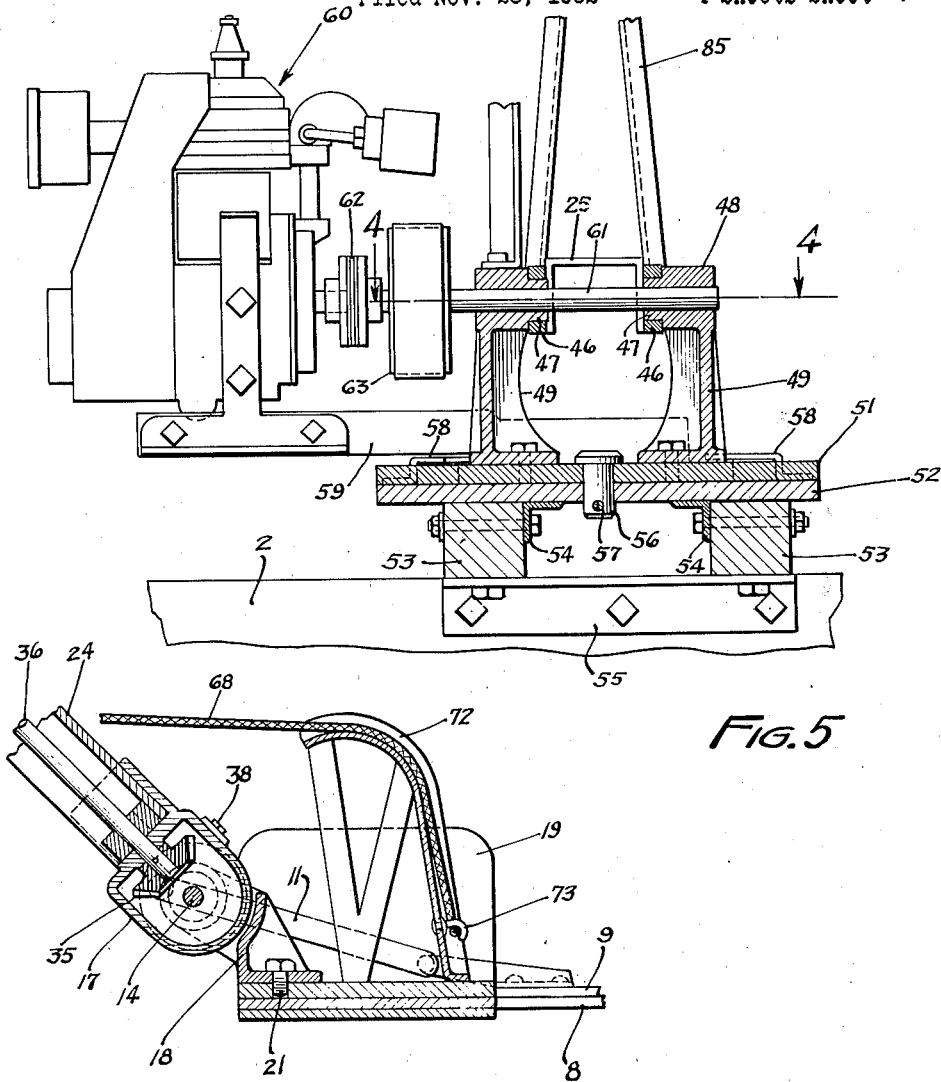
Figure 5 is an enlarged detail partially sectional view on the line 5—5 of Figure 2.

The power means for operating the sickle actuating mechanism is located on the vehicle, and as shown in this embodiment of the invention may consist of a small internal combustion engine, indicated generally by the numeral 60, and suitably supported upon a pair of outwardly extending arms or brackets 59 suitably secured to the rotatable plate 51 of the supporting structure 30, as best shown in Figures 2 and 5. The power device 60 may be of conventional design and it is therefore thought unnecessary to describe the same in detail.

The engine 60 is shown in Figure 5 operatively connected to a shaft 61 by a suitable clutch or flexible coupling 62. The shaft 61 is mounted in the bearings 48 and has a pulley 63 secured thereto which has a driving connection with a pulley 64 secured to the shaft 26 by means of a suitable belt 65. (See Figure 3). By the above arrangement, when the engine 60 is operated, power will be transmitted through the belt 63, gears 43 and 44, shafts 42 and 36, gears 35 and 34, shaft 14, and pitman 11, to the sickle 9, which reciprocates in cutter bar 8 carried on arm 23 as seen in Figure 1.

The shafts 14, 26, and 61 pass through the hinge joints of the supporting arm 23 and cutter bar 8 so that these parts may be adjusted to different positions, as indicated by the full and dotted lines in Figure 1, without effecting the operation of the drive between the sickle 9 and combination of a vehicle separable from the mowing device, as there are numerous features and combinations herein disclosed which may obviously be applied to mowing machines having their own ground wheels, and such machines are broadly included. In such a machine, either a ground wheel might operate the cutting device if drawn by horses or tractor, or the same engine which operates the cutting device might also operate a ground wheel or wheels to propel the machine.

Also, in apparatus for mounting on a truck, the source of power may be the usual power takeoff provided on the truck transmission. In such a case, the possibility of horizontally swinging the arm 23 can be retained, for example, by operating the shaft 61 through beveled gears from a vertical shaft passing through plates 51 and 52 on the center where pin 56 is shown in the drawings. This vertical shaft can be actuated in any suitable manner from the power takeoff of the truck transmission.

When a machine is desired for extending the arm 23 vertically to trim trees, a sector and pinion device similar to that controlling the two sections of arm 23 can be substituted in place of drum 82 and cable 84 for controlling the articulation of arm section 25 about the supporting structure 30, and locking means can then be employed to prevent the vertically extending arm from tipping over due to movement of the machine over uneven ground. Also, for such an application, the cutter bar 8 can be provided with a spring to prevent its tipping over when vertically positioned, and to maintain a tension in cable 68.

It is also apparent that adjustability of the cutting means laterally to the direction of travel by means manipulated by an operator on the vehicle or main portion of the machine, while mowing, is novel and of great advantage, and it is intended to claim this feature broadly as applied to any type of mowing machine.

I claim as my invention:

1. In combination with a vehicle, a mowing machine comprising a cutter bar, a connecting arm for said cutter bar having one end pivotally connected therewith, means on the vehicle for pivotally supporting the opposite end of said arm, a hinged joint in the arm, and means for actuating said arm to move the cutter bar towards or away from the vehicle.

2. In combination with a vehicle, a mowing machine comprising a cutter bar, a jointed connecting arm for said cutter bar having one end pivotally connected therewith, means on the vehicle for pivotally supporting the opposite end of said arm, operating means on the vehicle for said arm whereby the cutter bar may be positioned in relatively close proximity to the vehicle, and means supported by the vehicle for operating the cutter bar.

3. In combination with a vehicle adapted to travel on a highway, a mowing machine comprising a cutter bar, a supporting arm therefor comprising two hinged together sections, a supporting means for said arm, and means for actuating said supporting arm whereby the section thereof connected with the cutter bar, may be adjusted to an upright position to permit the cutter bar to be operated in close proximity to the outside of a guard rail situated along the highway.

4. In combination with a vehicle, a mowing machine comprising a cutter bar having a sickle, a supporting arm for said cutter bar comprising two hinged together sections, the section connected with the cutter bar being relatively longer than the other section, a supporting means on the vehicle to which said shorter arm section is pivotally connected, a power device on the vehicle for actuating the sickle, means for angularly adjusting the cutter bar whereby the latter may be positioned to mow a slope or bank, and means for operating said arm to move the cutter bar towards or away from the line of travel of the vehicle and also, whereby the cutter bar may be positioned in close proximity to the outside of a post situated beside the path of travel of the vehicle.

5. In combination with a vehicle, a mowing machine comprising a cutter, a transversely extending supporting arm therefor comprising hinged together sections, one of which is hinged to the cutter, and the other having a universal connection with the vehicle whereby the arm and cutter may be folded in close proximity to the vehicle, and whereby it may also be swung around in line with the normal path of travel thereof.

6. In combination with a vehicle, a mowing machine comprising a suitable support carried on the vehicle, a foldable arm having one end pivotally connected to said support and adapted to be laterally extended from the vehicle, cutting elements pivotally connected to the opposite end of said arm, power means on said support for operating said cutting elements, and control means operable from the vehicle to control the entire operation of said mowing machine.

7. In combination with a vehicle, a mowing machine comprising a suitable support carried on the vehicle, an adjustable and foldable arm having one end operatively connected with said support and adapted to be laterally extended from the vehicle, cutting elements operatively connected with the opposite end of said arm, means for operating said cutting elements, means on said support for adjusting said arm to move the cutting elements towards or away from the vehicle, and means by which said support may be relatively rotated about a vertical axis to swing said foldable arm and said cutting elements to a position rearwardly of the vehicle.

8. In combination with a vehicle, a mowing machine comprising a suitable support carried on the vehicle, a foldable arm having one end operatively connected with said support and adapted to be laterally extended from the vehicle, cutting elements operatively connected with the opposite end of said arm, means for operating said cutting elements, means on said support for operating said arm to move the cutting elements towards or away from the vehicle, and means for adjustably securing said support to the vehicle whereby said arm and associated parts may be relatively rotated about a vertical axis to angularly adjust the cutting elements with respect to the line of travel of the vehicle, and whereby said arm and associated parts may be suspended entirely from the vehicle.

9. In a mowing machine, a supporting structure having suitable carrying wheels, an arm comprising hinged together sections, one of which is pivotally mounted on said supporting structure, cutting elements pivotally connected to the other of said arm sections whereby said elements may be extended laterally from said supporting structure, power means carried on said structure, the engine. It will also be seen that by pivotally supporting the cutter bar 8 for swinging movement about the axis of the shaft 14, it may be adjusted to different angles of articulation as indicated by the full and dotted line positions in Figure 1, without effecting the driving connection between the sickle and the shaft 14.

The means for relatively adjusting the angular position of the cutter bar 8 with respect to the arm 23 and with respect to the slope of the ground being mowed, is best shown in Figures 1, 2, 4 and 6, and may consist of a small winding drum 66 suitably supported upon the circular plate 51 and having an operating crank or wheel 67. A cable 68 has one end operatively connected with the winding drum 66 and passes over a sheave 69 shown mounted upon the bracket 27, thence downwardly therefrom to a sheave 71 mounted upon the lower portion of the arm section 24 and has its lower end suitably secured to the lower portion of an upstanding bracket 72 by such means as a hook or eye 73. The bracket 72 is suitably secured to the shoe 19 of the cutter bar 8, and extends upwardly therefrom to elevate the cable 68 above the shaft 14 so as to facilitate swinging the cutter bar to angularly adjust it. The winding drum 66 may be provided with a suitable ratchet or worm device, not shown, for locking it in adjusted position.

Means is provided for varying the angular articulation between the sections 24 and 25 of the arm 23 which supports the cutter bar 8, whereby the latter may be extended from the vehicle or moved to a position adjacent thereto, as shown in the full and dotted lines in Figure 1. To thus operate the arm 23, a suitable gear segment 73 is shown secured to the arm section 24, adjacent to the bracket 28, by such means as bolts 74. Pinion 75 meshing with segment 73 is secured to shaft 76 supported in bearing 77 mounted on the arm section 25. A suitable operating device 78 has a driving connection 79 with shaft 76 and is provided with an operating crank 81, conveniently located with respect to the other controls of the apparatus. The operating device 78 is provided with suitable means, not shown, for locking it in adjusted position.

The means as here shown for vertically swinging or adjusting the position of the upper arm section 25 which carries section 24 and cutter bar 8, as shown by the full and dotted lines in Figure 1, may consist of a suitable winding drum 82, which also is mounted upon the circular plate 51 and is provided with a worm gear or other suitable locking device for locking it in adjusted position. The drum 82 has a suitable operating wheel 83 whereby it may be conveniently rotated. One end of a cable 84 is operatively connected with the drum 82 and has its opposite end secured to the upper end of a standard 85 secured to the arm section 25, as best shown in Figure 1. When the drum 82 is rotated in a direction to wind the cable 84 thereon, the arm section 25 will be elevated as will readily be understood by reference to Figure 1. To relieve the cable 84 and the drum 82 from undue strain, a suitable device, such as spring 86, connected to upright 87 and also connected by means of flexible member 88 to standard 85, may be provided for counteracting a large portion of the weight of the arm 23 and the parts carried thereon. Through these means, the manipulation of wheel 83 controls the height of the cutter bar while mowing.

The novel highway mower herein disclosed provides a very practical apparatus for mowing the shoulders and slopes along highways as well as other inaccessible areas. Because of the arm 23 being jointed, as herein described, the cutter bar may be moved to a position in close proximity to the usual guard rail 84 so that by guiding the truck or vehicle along the highway adjacent to the guard rail, as shown in Figure 1, the cutter bar may be positioned to mow the grass along outside of the guard rail. It will also be seen that by relatively adjusting the articulation between the supporting structure 30, the arm sections 24 and 25 of the supporting arm 23, and cutter bar 8, the cutter bar may be carried at any desired height or angle and may also be extended outwardly away from the vehicle, so as to mow the grass on the shoulders and slopes, in the ditches or gutters provided along the highway, and also on the banks beyond the ditches. When the arm and cutter bar are in the positions shown in the dotted lines in Figure 1, the grass between the guard rail and the adjacent edge of the pavement may also be mowed without the vehicle blocking traffic.

It is also to be noted that in the embodiment of the invention shown in the drawings, the entire apparatus is supported directly upon the vehicle or truck, thereby rendering the apparatus much easier to manipulate and adjust, as compared to apparatus of this general character wherein the power device or engine 60 is carried upon a separate frame which rides upon ground wheels and to which the cutter bar is directly connected. Also, by taking the power from a source upon the truck or vehicle, as herein disclosed, the operator need not leave his station in the event that the power device requires adjustment or attention.

In actual operation, it has been found desirable to attach one end of a suitable chain or flexible element 91 to the arm section 24, the opposite end of which may be adjustably connected with an outwardly extending bracket 92, secured to the truck body or to the front bumper 7 of the vehicle. A similar chain 90 may extend from the arm section 24 to a similar bracket 89 provided at the rear of the truck body. These chains cooperate to hold the arm 23 from swinging horizontally about the pivot of supporting structure 30 when the mower is being operated. If desired, the forward chain 86 may be provided with a self-detaching link or shear pin, as indicated at 80, so that should the cutter bar encounter an obstruction such as a tree or a stone, said link or shear pin will become disconnected so as to avoid damaging the cutter bar and its supporting means. Chains 90 and 91 may be secured to the arm section 24 by means of a suitable clip or apertured bar 93 suitably secured to the upper part thereof, as best shown in Figure 2. For purposes of transportation, the chain 91 may also have convenient means for disconnecting it so that the entire arm and cutter bar assembly, including the driving means or engine may be swung around on plate 51 into a line extending backward from the vehicle, and there folded into a convenient carrying position, as shown in Figure 7. When being transported in this position, the cutter bar 8 with the associated knives cannot possibly fall into a laterally extending position where it might do serious damage to an object or person beside the moving vehicle.

It will be understood that the above described embodiment of the invention is in no way a limiting structure to which the invention is confined. For example, the invention is not confined to the power transmitting means operatively connecting said power means with said cutting elements, and means for relatively adjusting said arm sections to move said cutting elements towards or away from said supporting structure.

10. In an apparatus of the class described, a supporting structure having suitable carrying wheels, an arm comprising hinged together sections, one of which is pivotally mounted on said supporting structure, cutting elements pivotally connected to the free end of the other of said arm sections, means for operating said cutting elements, and means for relatively adjusting said arm sections whereby they may be positioned to clear the tops of guard rails or posts along the highway, and whereby the cutting elements may be positioned in close proximity to the sides of said guard rails or posts opposite from said carrying wheels.

11. A mowing machine comprising a main structure supported on ground wheels, cutter driving means supported by said structure, a first arm portion extending laterally from said structure and pivoted thereto, a second arm portion pivoted to the first said portion, cutting elements pivoted on said second portion, power transmitting means for operating the cutting elements from said cutter driving means, and adjusting means for the said pivoted members.

12. A machine as claimed in claim 11 wherein the first said arm portion is at a relatively high position from the ground and adjustable laterally beyond the ground wheels, thereby permitting the mowing of grass on the opposite side of a post with respect to said wheels.

13. The combination with a vehicle, a mowing machine comprising a cutter, a transversely extending supporting arm therefor, comprising hinged together sections which are hinged respectively to the cutter and to a universal connection on the vehicle, whereby the arm and cutter may be folded in close proximity to and swung around in line with the normal path of travel.

14. In a machine for cutting vegetable growth, an articulated arm comprising a plurality of pivotally connected sections, cutting mechanism carried by said arm, means for driving the cutting mechanism, means for adjusting the articulated arm thereby to position the cutting mechanism, and means for lengthening one of said sections.

15. In a machine for cutting vegetable growth, a main support, an articulated arm comprising a plurality of pivotally connected sections and pivotally connected to the support at one end, cutting mechanism carried by the arm at its other end, a source of power, power transmitting means on each of said sections connected to the power source and to the cutting mechanism for driving the latter, means for adjusting the articulated arm thereby to position the cutting mechanism, and means for lengthening one of said sections and the power transmitting means thereon.

JOHN S. CLAPPER